Figure 1:
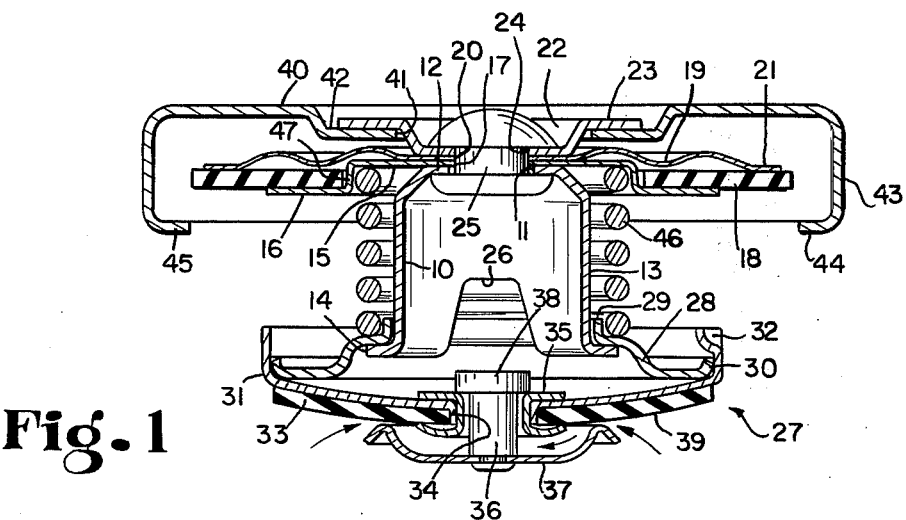

United States Patent [19]
Crute

[11] 3,878,965
[45] Apr. 22, 1975

[54] PRESSURE-VACUUM RELIEF VEHICLE RADIATOR CAP WITH FREE-TURNING SHELL

[75] Inventor: Billy G. Crute, Connersville, Ind.

[73] Assignee: Stant Manufacturing Company, Inc., Connersville, Ind.

[22] Filed: May 13, 1974

[21] Appl. No.: 469,086

[52] U.S. Cl. ................. 220/295; 220/298; 220/303
[51] Int. Cl. ............................................ B65d 51/16
[58] Field of Search ........... 220/203, 303, 301, 295, 220/288, 293, 367, 349, 299, 304, 302, 256, 299; 137/493

[56] References Cited
UNITED STATES PATENTS

| | | | |
|---|---|---|---|
| 2,195,266 | 3/1940 | Bailey | 270/301 |
| 2,679,946 | 6/1954 | Friend | 220/303 |
| 2,684,780 | 7/1954 | Friend | 220/295 |
| 2,918,191 | 12/1959 | Pipes et al. | 220/301 |
| 3,027,043 | 3/1962 | Nestic | 220/303 |
| 3,053,408 | 9/1962 | Rodgers | 220/203 |
| 3,111,239 | 11/1963 | Ivars | 270/303 |
| 3,189,213 | 6/1965 | Nimmo | 220/303 |
| 3,703,245 | 11/1972 | Brewer | 270/302 |

*Primary Examiner*—William I. Price
*Assistant Examiner*—Allan N. Shoap
*Attorney, Agent, or Firm*—William R. Coffey

[57] ABSTRACT

A pressure-vacuum relief valved cap for the radiator filler neck of an internal combustion engine in which a domed member having a shank and a radially-extending abutment at the lower end of the shank, a support member for an annular gasket, a resilient diaphragm and a discoid retainer member are all joined together by a common rivet, a pressure relief valve is reciprocably supported on the shank of the domed member, a coiled spring is sleeved on the shank and confined between the support member and the valve, the valve is provided with a port, and a vacuum relief valve having a headed stem penetrating the port is normally spaced from the first-named valve but will be seated on the first-named valve in closing relation to the port by a superatmospheric pressure condition in the radiator when the cap is fully seated on the filler neck, and a manually manipulable shell having fingers for camming engagement with the filler neck to close the gasket and the first-named valve against seats in the filler neck, the shell being centrally perforated to provide a sunken surface loosely engaged beneath the outer peripheral region of the retainer so that the shell can be turned for such camming action without scuffing the gasket or the first-named valve against their respective seats.

9 Claims, 2 Drawing Figures

PATENTED APR 22 1975  3,878,965

PRESSURE-VACUUM RELIEF VEHICLE RADIATOR CAP WITH FREE-TURNING SHELL

The present invention relates to a pressure-vacuum relief cap primarily intended for use on conventional filler necks of the radiators of internal combustion engines; and the primary object of the invention is to provide an improved cap of that character having novel features of construction which, at reduced cost and improved facility of manufacture and assembly, will provide for automatic seating of a plurality of sealing devices as a result of turning the cap relative to the associated filler neck, while guarding against scuffing of the sealing members against stationary seats provided by the filler neck.

Further objects of the invention will appear as the description proceeds.

To the accomplishment of the above and related objects, this invention may be embodied in the form illustrated in the accompanying drawings, attention being called to the fact, however, that the drawings are illustrative only, and that change may be made in the specific construction illustrated and described, so long as the scope of the appended claims is not violated.

Figure 2:
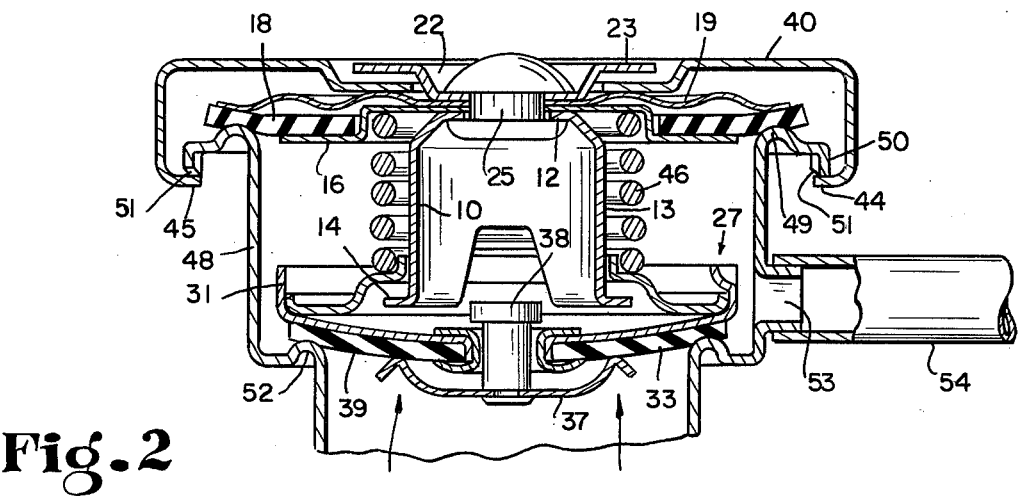

In the drawings:

FIG. 1 is a diametrical section through a cap constructed in accordance with the present invention; and FIG. 2 is a similar section showing the improved cap in sealing association with a conventional filler neck.

Referring more particularly to the drawings, it will be seen that I have illustrated a domed member 10 formed with a central aperture 11 in its top 12 and having a shank 13 terminating in a radially extending abutment means 14 at its lower end. A support member 15 is formed to provide a downwardly offset outer peripheral region 16, such support member being formed with a central aperture 17. A rubberoid annular gasket 18 rests upon the region 16 and is proportioned and designed to overhang the outer boundary of the support member region 16. A resiliently-flexible diaphragm 19 is formed with a central aperture 20 and is so positioned that its outer peripheral region 21 bears against the overhanging region of the gasket 18. A retainer member 22 is centrally dished as shown to provide an upwardly offset outer peripheral region 23 and is formed with a central aperture 24.

A single rivet 25 penetrates the apertures 11, 17, 20 and 24 and is headed over to grip the members 10, 15, 19 and 22.

The lower region of the shank 13 is formed with opposite windows 26, only one of which is shown, whereby fluid may pass between the interior and the exterior of the domed member 10.

A valve carrier is indicated generally by the reference numeral 27 and includes an annular thimble 28 whose inner edge is upturned to provide a collar 29 loosely sleeved on the shank 13 of the domed member 10 but, of course, limited in its downward movement by the abutment means 14.

The outer edge of the thimble 28 is also preferably turned upwardly as at 30 to fit snugly within a cup 31. The cup 31 is secured to the thimble 28 by means of crimping 32, preferably at three equidistantly spaced points about the periphery of the cup rim. Preferably the crimping is of such character as affirmatively to prevent separation of the cup 31 from the thimble 28, but to permit relative rotation between the cup and the thimble.

A second gasket 33 having a central aperture 34 which mates with a similar aperture through the cup 31 is held in place on the outer surface of the cup by means of a grommet 35. A stem 36 penetrates the grommet 35 and carries on its lower end a vacuum-relief valve 37. At its upper end, the stem is provided with a head 38 having a transverse dimension exceeding that of the bore of the grommet 35 so that, although the valve 37 is gravity-biased to the position of FIG. 1 in which it does not contact the surface 39 of the gasket 33, the valve can move only a limited distance away from said surface 39.

A coiled spring 46 surrounds the shank 13 of the domed member 10 and is confined between the support member 15 and the thimble 28, thus resiliently yieldably resisting movement of the thimble 28 and its associated parts toward the support member 15. Preferably, but not necessarily, the upper convolution of the spring 46 rather snugly fits within the shoulder 47 of the support member 15.

A manually manipulable shell 40 is formed with a central perforation 41 in a preferably-sunken central region 42. The parts are so proportioned and designed that, before the retainer member 22 is slipped onto the upper shank of the rivet 25, its central region will be entered through the perforation 41 of the shell so that, when the rivet 25 is headed over, the central region of the shell will be entrapped between the upwardly-offset region 23 of the retainer member 22 and the central region of the diaphragm 19. The sunken region 42 of the shell, however, is loosely so entrapped so that the shell 40 is readily rotatable relative to the retainer member 22.

The shell 40 is formed to provide a depending, peripheral skirt 43 which, at two diametrically opposite points, is provided with inturned camming fingers 44 and 45.

A conventional filler neck for the radiator of an internal combustion engine is indicated at 48 and is formed to provide, at its upper extremity, an annular seat 49 surrounded by a downturned flange 50 whose lower edge is formed to define oppositely inclined camming surfaces 51, 51. In accordance with conventional practice, the spout lip is oppositely interrupted to permit the passage of the fingers 44, 45 therethrough and into engagement with the surfaces 51, whereupon turning movement of the shell 40 will pull the entire cap assembly downwardly on the filler neck. The gasket 33 will engage the seat 52 and, as the cap assembly is drawn down, the valve assembly 27 will be arrested while the domed member 10 continues to move downwardly. Meantime, the gasket 18 has engaged seat 49 and, as the cap assembly continues downwardly, the gasket 18 will be pressed firmly against the seat 49 and will be flexed against the restraining tendency of the resilient diaphragm 19.

Now, as will be seen from an examination of FIG. 2, the gasket 33 seals the interior of the radiator while the gasket 18 cooperates therewith to define a chamber from which the only escape is the vent port 53.

Assuming a cold system, the valve 37 will still hang down below the surface 39; but, as the engine cooling system becomes warmer, a superatmospheric pressure will begin to develop in the cooling system; and fluid moving past the periphery of the valve 37 will quickly lift that valve to the position of FIG. 2 in which the valve body bears sealingly against the surface 39 in surrounding relation to the port 34 to prevent further escape of fluid from the radiator.

If pressure within the radiator should build up beyond a predetermined value, determined by the strength and calibration of the spring 46, that pressure will lift the valve assembly 27 bodily, whereupon fluid can escape past the valve 33 to the vent port 53, while the gasket 18 prevents the escape of fluid past the seat 49 which might scald an operator having his hand on the shell 40.

Of course, in normal operation, the pressure within the radiator will not exceed that predetermined value and the gasket 33 will remain on its seat 52.

If, after a period of operation of the engine, the engine is stopped, the contents of the cooling system will slowly cool off, whereby pressure exerted against the valve 37 and the gasket 33 will decrease until, when that pressure approaches atmospheric, the valve 37 will, by its own weight and the weight of the stem 36 and head 38, drop to the position of FIG. 1. If the pressure value within the cooling system should drop to a subatmospheric level, air will, of course, flow inwardly through the windows 26 and port 34 to escape past the periphery of the valve 37 into the cooling system.

As will be apparent from the above description, the gasket 33 and the gasket 18 reach contact with their respective seats before the cap assembly has been drawn down to its completely seated position. That means that the shell 40 must be turned, in a seating direction, while the gaskets 18 and 33 are in contact with their respective seats. Scuffing damage would result if those gaskets turned with the shell 40; but on first contact of the gaskets with their seats, the members gripped by the rivet 25 will stop and the gaskets will not thereafter move relative to their seats, whether the shell is turned in a seating direction or in an unseating direction.

Anti-scuff provisions in radiator caps of the general character here under consideration are not broadly new; but the applicant's arrangement wherein the shell 40 is retained against axial dislocation by a member which limits axial movement of the shell relative to the valve assembly has advantages over any such anti-scuff devices known to me.

I claim as my invention:

1. For use with a reservoir filler neck formed to provide an upwardly-facing peripheral seat and a downturned peripheral flange presenting a downwardly-facing cammed edge, a valved closure cap comprising a valving assembly including a domed member having an aperture in its upper end and radially-outwardly extending means at its lower end, a discoid support member having a central aperture, a discoid resilient diaphragm member having a central aperture, and a discoid retainer member having a central aperture, rivet means penetrating said apertures and gripping said members, annular gasket means resting on said support member, projecting radially outwardly beyond said support member and peripherally engaged by said diaphragm member, and shell means having a central perforation penetrated by said retainer member and loosely underlying the outer peripheral region of said retainer member, said shell member having a depending skirt carrying at least two radially-extending fingers engageable with the cammed edge of such a filler neck to force said gasket means into contact with such a seat and to flex said diaphragm.

2. The invention defined in claim 1 wherein such a filler neck is formed to provide a second seat inside said neck, a valve carrier reciprocably slidably guided on said domed member, a second gasket supported on said carrier and movable therewith into and out of sealing engagement with said second seat, and spring means urging said carrier into contact with said radially-outwardly extending means, said gaskets being so relatively positioned that said second gasket will contact such a second seat before said diaphragm has been fully flexed.

3. The invention of claim 2 in which said second gasket and said carrier are formed with registering ports therethrough, and a valve positioned to prevent fluid flow through said ports toward said domed member but to permit fluid flow through said ports away from said domed member.

4. The invention of claim 3 in which said valve is disposed on that side of said second gasket which is remote from domed member and is provided with a stem penetrating and guided in said ports, and said valve is pressed sealingly against said second gasket by superatmospheric pressure within such a reservoir when said cap is fully seated on such a filler neck.

5. The invention of claim 4 in which said valve stem is provided with a head, located on that side of said second gasket which is nearer to said domed element, said head having a transaxial dimension greater than that of at least one of said ports.

6. A pressure-vacuum relief cap for the radiator of an internal combustion engine comprising a domed member having a central aperture in its upper end and radially-extending abutment means near its lower end, a support member having a central aperture, an annular gasket supported on said support member and overhanging the outer periphery of said support member, a resilient diaphragm having a central aperture and bearing at its outer periphery upon said gasket, and a retainer member having a central aperture and having an outer peripheral region offset upwardly, a rivet penetrating all of said apertures and gripping all of said members, valve means loosely guided on said domed member, spring means resiliently resisting movement of said valve means away from said abutment means, and a manually manipulable shell having a central opening, said retainer member penetrating said shell opening with said upwardly offset region loosely overlying the region of said shell which immediately surrounds said shell opening, and camming means adjacent the outer periphery of said shell.

7. The cap of claim 6 in which said valve means comprises a carrier reciprocably slidably guided on said domed member, a second gasket supported on said carrier and facing away from said annular gasket, said second gasket having a port therethrough, and a vacuum relief valve arranged for seating on the surface of said second gasket which is remote from said annular gasket to close said port.

8. The cap of claim 7 in which said vacuum-relief valve is gravity-biased to a position spaced from said second gasket.

9. The cap of claim 8 in which said vacuum-relief valve is provided with a stem penetrating said second gasket port, said stem having a transaxial dimension greater than that of said port.

* * * * *